No. 826,328. PATENTED JULY 17, 1906.
F. W. GORDON.
CORN TOPPING TOOL.
APPLICATION FILED SEPT. 13, 1905.
2 SHEETS—SHEET 1.
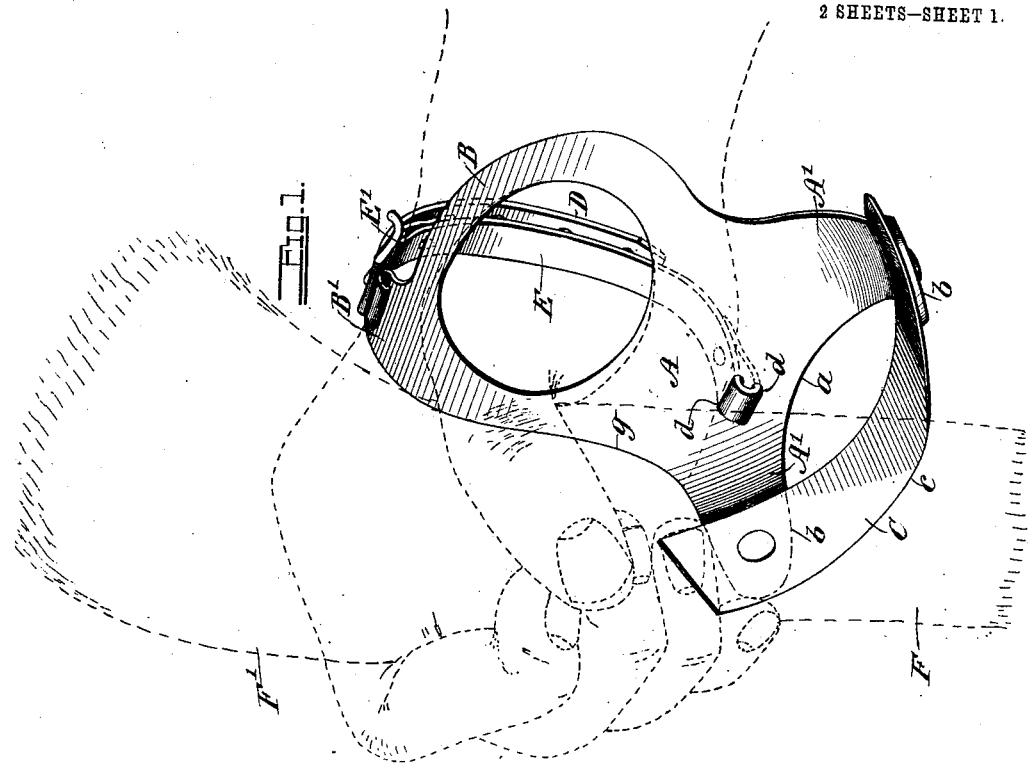
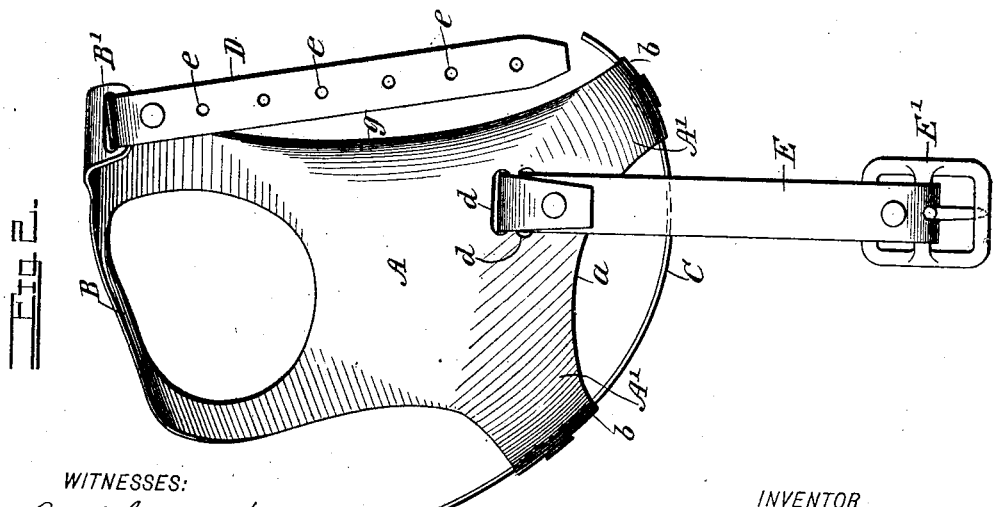
WITNESSES:
L. Almquist
Wm. P. Patton
INVENTOR
Frederick W. Gordon
BY Munn
ATTORNEYS No. 826,328. PATENTED JULY 17, 1906.
F. W. GORDON.
CORN TOPPING TOOL.
APPLICATION FILED SEPT. 13, 1905.
2 SHEETS—SHEET 2.
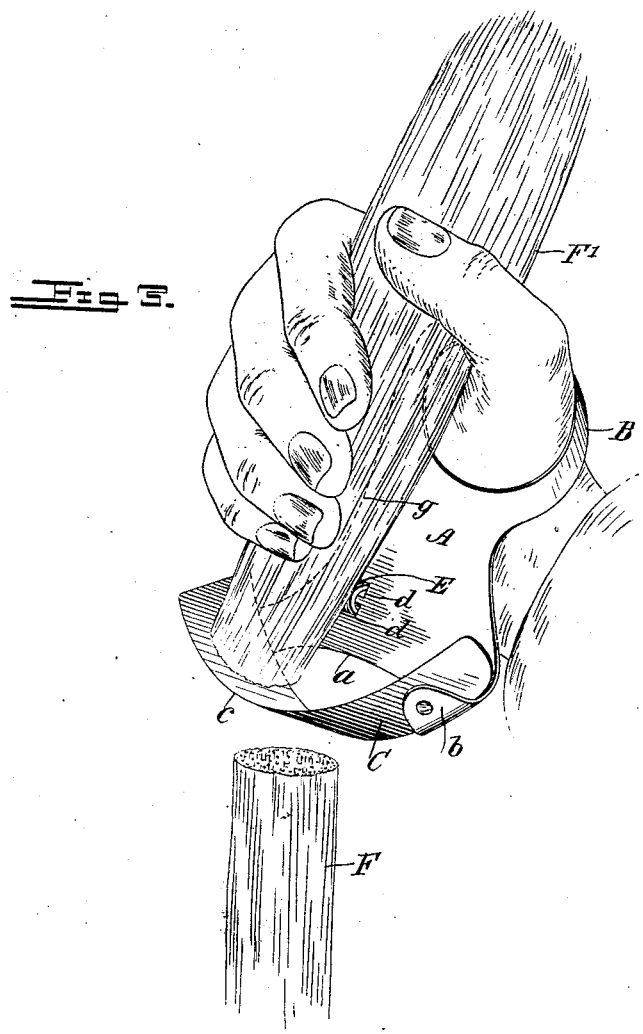
INVENTOR
Frederick W. Gordon

UNITED STATES PATENT OFFICE.

FREDERICK WILLIAM GORDON, OF MIAMI, TEXAS.

CORN-TOPPING TOOL.

No. 826,328.

Specification of Letters Patent.

Patented July 17, 1906.

Application filed September 13, 1905. Serial No. 278,270.

*To all whom it may concern:*

Be it known that I, FREDERICK WILLIAM GORDON, a citizen of the United States, and a resident of Miami, in the county of Roberts and State of Texas, have invented a new and Improved Corn-Topping Tool, of which the following is a full, clear, and exact description.

For the removal of the heads of cereals—such as Kafir corn, broom-corn, or the like—from the stalks that are standing as they grew in a field it has been customary to grasp the stalk near the head portion with one hand and by manipulation of a suitable knife held in the other hand cut the head from the stalk, the several heads as they are detached being thrown into the body of a wagon that is moved along rows of the standing cornstalks for the reception of the topped heads.

The object of my invention is to provide a novel simple cutting-tool that may be placed on either or on both hands of the operator and cut the corn-heads from the stalks when the heads have been grasped and the tool or tools subsequently manipulated so as to forcibly impinge the sharp edge of a knife that is a part of each tool against the stalk near the head while the latter is grasped, the cut heads being thrown into a suitable receptacle, thus greatly expediting the operation of removing the heads of cereals from the standing stalks.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improved corn-topping tool mounted upon an operator's hand (shown by dotted lines) and in which is grasped a head of Kafir corn, the stalk of which is disposed near the cutter-blade of the tool. Fig. 2 is a plan view of the improved tool removed from the user's hand; and Fig. 3 is a perspective view showing the improvement on one's hand, grain-heads grasped by said hand and cut from the stalk by manipulation of the tool.

The stock or body of the improved tool is preferably formed of plate metal shaped by suitable cutting and pressing dies so as to fit neatly into the palm of the hand when donned for use, the portion A that has intimate contact with the palm having a looped extension B thereon of proper conformation to receive and neatly embrace the ball of the thumb, as is clearly shown in Fig. 3. The opposite side edge $a$ of the tool-stock A is scalloped, leaving two bracket-limbs A' remaining intact with said stock. On each bracket-limb A' a flange $b$ is formed that is turned at a right angle thereon away from the side of the stock A, that in use seats upon the user's palm. A cutting-knife C, that is preferably of thin steel plate curved laterally, as best shown in Fig. 2, is secured upon the flanges $b$ so as to dispose the cutting edge $c$ of the knife below and at a proper distance from the center of the stock A. An ear B' is formed on the looped extension B and curved so as to lap upon the back of the hand below the forefinger when the device is mounted for service, and upon said ear one end of a strap D is secured.

Between the limbs A' near the scalloped edge $a$ of the stock A two adjacent slots $d$ are formed parallel with each other, and in said slots one end portion of a complementary strap E is looped and secured, as indicated in the drawings, said strap having a buckle E' thereon and the other strap a series of perforations $e$. The edge of the stock A that in use is disposed near the fingers of the user's hand is preferably concaved, as is shown at $g$, thus affording proper clearance to enable the free opening and closure of the hand when the tool is placed thereon.

It is intended that there be essentially duplicate tools such as described provided, one for each hand, they of course being shaped to fit upon the right hand and left hand of the operator, the tool illustrated being obviously designed for use on the right hand, and to enable the effective employment of the device as a cutting instrument the stock A is donned by first inserting the thumb of the right hand through the loop B, which will permit the stock A to fit closely into the palm of said hand. The straps D and E are now buckled together across the back of the hand, as is indicated in Fig. 1, which will bind the instrument firmly upon the hand, so that it may be controlled by flexure of the wrist. It will be noted in Fig. 1 that the curved cutting-blade C is now disposed a distance below the hand, and the cutting edge $c$ thereon is projected outward or away from the thumb of the hand.

In use the operator who is about to remove the heads of broom-corn or Kafir corn grasps the head F' on a standing stalk F near its juncture with said stalk, the hand then being disposed nearly horizontal, as indicated by dotted lines in Fig. 1. This will cause the cutting edge c of the knife C to rest against the stalk F a short distance below the head portion F'. Instantly upon taking hold of the head of corn as explained the operator bends his wrist so as to rock the knife-blade against the stalk F with a shearing movement, which will cut the stalk and leave the head in the hand of the operator, as is shown in Fig. 3. The head F' is thrown into a receptacle, which may be of any suitable character, and the operation is indefinitely repeated.

With practice both hands may be used either successively or simultaneously on adjacent rows of cereals and the beheading of the stalks be conducted rapidly and with ease.

Having thus described my invention, I claim as new and desire to secure by Letters Patent—

1. A corn-beheading tool, comprising a stock fitted to the palm of the hand, a thumb-loop on the stock, spaced limbs provided with flanges projecting from the stock, a curved blade having each end secured to a flange, and means for securing the stock to the hand.

2. A corn-beheading tool, comprising a stock fitted to the palm of the hand, spaced limbs projecting from the stock, a curved blade secured at each end to one of the limbs, and means for securing the stock to the hand.

3. A corn-beheading tool embodying a plate-metal stock fitted to the palm of one's hand, a thumb-loop on one edge of the stock, a bent ear on the thumb-loop, two straps one having a buckle on one end, and respectively secured on the ear and stock, two limbs on the edge of the stock that is opposite from the thumb-loop, an angularly-bent flange on each limb, and a curved plate-metal cutting-blade secured on said flange and held projected away from and at an angle to the stock.

In testimony whereof I have signed my name to this specification in the presence of two subscribing witnesses.

FREDERICK WILLIAM GORDON.

Witnesses:
FRANK P. HEARE,
JOHN E. KINNEY.